United States Patent
Lvin

(10) Patent No.: US 10,198,338 B2
(45) Date of Patent: Feb. 5, 2019

(54) SYSTEM AND METHOD OF GENERATING DATA CENTER ALARMS FOR MISSING EVENTS

(71) Applicant: ALCATEL-LUCENT USA INC., Murray Hill, NJ (US)

(72) Inventor: Vyacheslav Lvin, San Jose, CA (US)

(73) Assignee: Nokia of America Corporation, Murray Hill, NJ (US)

( * ) Notice: Subject to any disclaimer, the term of this patent is extended or adjusted under 35 U.S.C. 154(b) by 698 days.

(21) Appl. No.: 14/276,669

(22) Filed: May 13, 2014

(65) Prior Publication Data
US 2015/0331777 A1    Nov. 19, 2015

(51) Int. Cl.
G06F 17/30     (2006.01)
G06F 11/32     (2006.01)
H04L 12/24     (2006.01)
G06F 9/455     (2018.01)

(52) U.S. Cl.
CPC ........ *G06F 11/327* (2013.01); *G06F 9/45558* (2013.01); *G06F 17/3033* (2013.01); *G06F 17/30864* (2013.01); *H04L 41/065* (2013.01); *H04L 41/5025* (2013.01); *H04L 41/5061* (2013.01)

(58) Field of Classification Search
CPC .................................................. G06F 17/3033
USPC ........ 707/663, 664, 605, 606, 689; 713/193; 726/22
See application file for complete search history.

(56) References Cited

U.S. PATENT DOCUMENTS

| | | | |
|---|---|---|---|
| 5,636,206 A | 6/1997 | Amemiya et al. | |
| 6,820,121 B1 * | 11/2004 | Callis | H04L 45/745 709/225 |
| 7,404,205 B2 * | 7/2008 | Scoredos | H04L 63/0254 709/228 |
| 2002/0154010 A1 * | 10/2002 | Tu | G06F 11/0709 340/517 |
| 2005/0108523 A1 * | 5/2005 | West | H04L 63/0823 713/165 |
| 2006/0123022 A1 | 6/2006 | Bird | |
| 2006/0224542 A1 * | 10/2006 | Yalamanchi | G06N 5/04 706/47 |
| 2007/0213600 A1 | 9/2007 | John et al. | |
| 2008/0082836 A1 * | 4/2008 | Osaki | G06F 21/62 713/193 |
| 2009/0106603 A1 | 4/2009 | Dilman et al. | |
| 2010/0036939 A1 | 2/2010 | Yang et al. | |
| 2010/0042744 A1 | 2/2010 | Rahman et al. | |
| 2010/0052924 A1 | 3/2010 | Bajpay et al. | |
| 2010/0157812 A1 | 6/2010 | Blocker et al. | |
| 2010/0174919 A1 * | 7/2010 | Ito | G06F 21/554 713/192 |
| 2010/0332652 A1 * | 12/2010 | Bhattacharya | H04L 41/069 709/224 |
| 2011/0119219 A1 * | 5/2011 | Naifeh | H04L 41/0604 706/47 |
| 2011/0211459 A1 | 9/2011 | Meloche | |
| 2012/0030736 A1 * | 2/2012 | Resch | H04L 1/0045 726/5 |

(Continued)

Primary Examiner — Baoquoc N To
(74) Attorney, Agent, or Firm — Tong, Rea, Bentley & Kim, LLC

(57) ABSTRACT

Systems, methods, architectures, mechanisms and/or apparatus to manage alarm generation associated with the failure of an expected event or action to occur.

12 Claims, 5 Drawing Sheets

(56) References Cited

U.S. PATENT DOCUMENTS

| | | | |
|---|---|---|---|
| 2012/0033544 A1 | 2/2012 | Kung et al. | |
| 2012/0284221 A1* | 11/2012 | Shelton | H04L 41/0604 706/47 |
| 2013/0262852 A1* | 10/2013 | Roeder | H04L 9/0894 713/150 |
| 2013/0268496 A1* | 10/2013 | Baldwin | G06F 17/30156 707/692 |
| 2013/0268770 A1* | 10/2013 | Hunt | G06F 17/3033 713/189 |
| 2013/0290520 A1 | 10/2013 | Noo et al. | |
| 2013/0311196 A1 | 11/2013 | Fay et al. | |
| 2014/0032861 A1* | 1/2014 | Islam | G06F 3/064 711/162 |
| 2014/0077956 A1 | 3/2014 | Sampath et al. | |
| 2014/0111335 A1 | 4/2014 | Kleiss et al. | |
| 2014/0223029 A1* | 8/2014 | Bhaskar | H03M 7/3088 709/247 |
| 2015/0180967 A1* | 6/2015 | Takagishi | H04M 1/72561 709/204 |
| 2015/0213358 A1* | 7/2015 | Shelton | H04L 41/0604 706/47 |
| 2016/0100348 A1* | 4/2016 | Cohn | G08B 29/02 370/225 |

* cited by examiner

FIG. 3      300

SYSTEM AND METHOD OF GENERATING DATA CENTER ALARMS FOR MISSING EVENTS

CROSS-REFERENCE TO RELATED APPLICATION

This application is related to co-pending U.S. patent application Ser. No. 14/107,258, filed on Dec. 16, 2013, entitled SYSTEM AND METHOD FOR MANAGING DATA CENTER ALARMS, Vyacheslav Lvin, inventor.

FIELD OF THE INVENTION

The invention relates to the field of network and data center management and, more particularly but not exclusively, to management of event data in networks, data centers and the like.

BACKGROUND

Data Center (DC) architecture generally consists of a large number of computational resources, storage resources and the like that are interconnected through a scalable Layer-2 or Layer-3 infrastructure. In addition to this networking infrastructure running on hardware devices the DC network includes software networking components (v-switches) running on general purpose computer, and dedicated hardware appliances that supply specific network services such as load balancers, ADCs, firewalls, IPS/IDS systems etc. The DC infrastructure can be owned by an Enterprise or by a service provider (referred as Cloud Service Provider or CSP), and shared by a number of tenants. Computing and storage infrastructure are virtualized in order to allow different tenants to share the same resources. Each tenant can dynamically add/remove resources from the global pool to/from its individual service.

Virtualized services as discussed herein generally describe any type of virtualized computing and/or storage resources capable of being provided to a tenant. Moreover, virtualized services also include access to non-virtual appliances or other devices using virtualized computing/storage resources, data center network infrastructure and so on. The various embodiments are adapted to improve event-related processing within the context of data centers, networks and the like.

Within the context of a typical data center arrangement, a tenant entity such as a bank or other entity has provisioned for it a number of virtual machines (VMs) which are accessed via a Wide Area Network (WAN) using Border Gateway Protocol (BGP). At the same time, thousands of other virtual machines may be provisioned for hundreds or thousands of other tenants. The scale associated with data centers may be enormous in that many thousands (or more) of virtual machines, virtual services and the like may be created and/or destroyed each day per tenant demand.

Each of the virtual ports, virtual machines, virtual switches, virtual switch controllers and other objects or entities within the data center (virtual and otherwise) generates event data in response to many different types of conditions. These various objects or entities are typically arranged in a hierarchical manner such the failure of an object or entity necessarily results in the failure of hierarchically lower objects or entities dependent upon or in communication with the failed object or entity. In this case, event data associated with the failed object or entity may be generated by a respective hierarchically higher object or entity. However, event data associated with the dependent hierarchically lower objects or entities may not be generated.

Further, in the case of the failed object or entity being restored, it is important to ensure that the dependent hierarchically lower objects or entities are also restored as expected. For example, the failure of the virtual port will necessarily result in the failure of a hierarchically lower a Border Gateway Protocol (BGP) entity. When the virtual port is restored, restoration of the BGP entity is expected. If the BGP entity is not restored then an alarm should be triggered. At present, there is no efficient mechanism by which the failure of the BGP entity to come up results in the triggering of the appropriate alarm.

Current solutions to this problem use a business rule management system (BRMS) such as Drools (or some other rules processing mechanism) wherein a working memory is associated with a rules engine, which is itself associated with a plurality of rule definitions. All events are stored in the working memory. Each time an event is received by the working memory the rule engine processes all of the defined rules against all of the events within the working memory. All events are stored within the working memory so that various rules can be processed against the stored elements to determine whether or not expected events have occurred, such as restoration of hierarchically lower objects or entities in conjunction with the restoration of a corresponding hierarchically higher object or entity.

Unfortunately, DROOLS and other known rules processing mechanisms are extremely resource hungry in terms of memory, processing resources and so on.

SUMMARY

Various deficiencies in the prior art are addressed by systems, methods, architectures, mechanisms and/or apparatus to manage alarm generation associated with the failure of an expected event or action to occur.

A method of generating alarms at a data center (DC) according to one embodiment comprises: receiving, for processing according to a rule, an event associated with a hierarchically arranged entity of a data center (DC); hashing the received event according to a hash table of the rule; in response to the hash table of the rule including a hash table entry corresponding to the event, deleting the hash table entry corresponding to the event and processing the event according to the rule; in response to the hash table of the rule not including a hash table entry corresponding to the event, determining an expected event corresponding to the received event and hashing the expected event corresponding to the received event to provide a hash table entry corresponding to the expected event; and in response to a failure to receive an expected event within a predetermined amount of time, generating an alarm.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be discussed within the context of systems, methods, architectures, mechanisms and/or apparatus adapted to efficiently process events according to an event pair paradigm wherein data indicative of unresolved event pair occurrences (i.e., occurrence of a first event which results in the expected occurrence of a second event) is stored in rule hash tables until such time as the event pair has been resolved or, in various embodiments, the predefined time period has elapsed. However, it will be appreciated by those skilled in the art that the invention has broader applicability than described herein with respect to the various embodiments.

Figure 1:
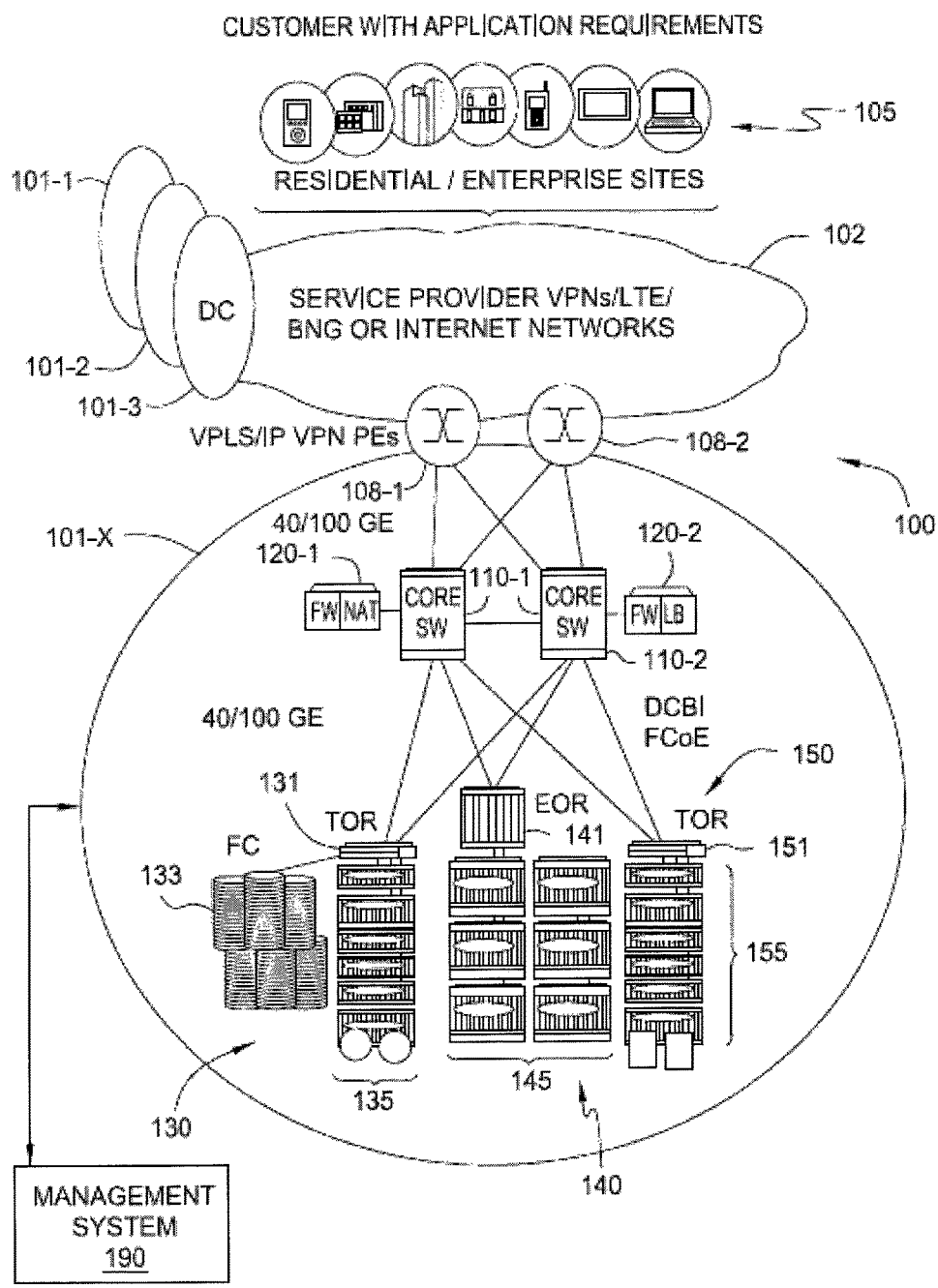
FIG. 1 depicts a high-level block diagram of a system benefiting from various embodiments.

FIG. 1 depicts a high-level block diagram of a system benefiting from various embodiments. Specifically, FIG. 1 depicts a system 100 comprising a plurality of data centers (DC) 101-1 through 101-X (collectively data centers 101) operative to provide computing and storage resources to numerous customers having application requirements at residential and/or enterprise sites 105 via one or more networks 102.

The customers having application requirements at residential and/or enterprise sites 105 interact with the network 102 via any standard wireless or wireline access networks to enable local client devices (e.g., computers, mobile devices, set-top boxes (STBs), storage area network components, Customer Edge (CE) routers, access points and the like) to access virtualized computer and storage resources at one or more of the data centers 101.

The networks 102 may comprise any of a plurality of available access network and/or core network topologies and protocols, alone or in any combination, such as Virtual Private Networks (VPNs), Long Term Evolution (LTE), Border Network Gateway (BNG), Internet networks and the like.

The various embodiments will generally be described within the context of IP networks enabling communication between provider edge (PE) nodes 108. Each of the PE nodes 108 may support multiple data centers 101. That is, the two PE nodes 108-1 and 108-2 depicted in FIG. 1 as communicating between networks 102 and DC 101-X may also be used to support a plurality of other data centers 101.

The data center 101 (illustratively DC 101-X) is depicted as comprising a plurality of core switches 110, a plurality of service appliances 120, a first resource cluster 130, a second resource cluster 140, and a third resource cluster 150.

Each of, illustratively, two PE nodes 108-1 and 108-2 is connected to each of the, illustratively, two core switches 110-1 and 110-2. More or fewer PE nodes 108 and/or core switches 110 may be used; redundant or backup capability is typically desired. The PE routers 108 interconnect the DC 101 with the networks 102 and, thereby, other DCs 101 and end-users 105. The DC 101 is generally organized in cells, where each cell can support thousands of servers and virtual machines.

Each of the core switches 110-1 and 110-2 is associated with a respective (optional) service appliance 120-1 and 120-2. The service appliances 120 are used to provide higher layer networking functions such as providing firewalls, performing load balancing tasks and so on.

The resource clusters 130-150 are depicted as computer and/or storage resources organized as racks of servers implemented either by multi-server blade chassis or individual servers. Each rack holds a number of servers (depending on the architecture), and each server can support a number of processors. A set of network connections connect the servers with either a Top-of-Rack (ToR) or End-of-Rack (EoR) switch. While only three resource clusters 130-150 are shown herein, hundreds or thousands of resource clusters may be used. Moreover, the configuration of the depicted resource clusters is for illustrative purposes only; many more and varied resource cluster configurations are known to those skilled in the art. In addition, specific (i.e., non-clustered) resources may also be used to provide computing and/or storage resources within the context of DC 101.

Exemplary resource cluster 130 is depicted as including a ToR switch 131 in communication with a mass storage device(s) or storage area network (SAN) 133, as well as a plurality of server blades 135 adapted to support, illustratively, virtual machines (VMs). Exemplary resource cluster 140 is depicted as including an EoR switch 141 in communication with a plurality of discrete servers 145. Exemplary resource cluster 150 is depicted as including a ToR switch 151 in communication with a plurality of virtual switches 155 adapted to support, illustratively, the VM-based appliances.

In various embodiments, the ToR/EoR switches are connected directly to the PE routers 108. In various embodiments, the core or aggregation switches 120 are used to connect the ToR/EoR switches to the PE routers 108. In various embodiments, the core or aggregation switches 120 are used to interconnect the ToR/EoR switches. In various embodiments, direct connections may be made between some or all of the ToR/EoR switches.

A VirtualSwitch Control Module (VCM) running in the ToR switch gathers connectivity, routing, reachability and other control plane information from other routers and network elements inside and outside the DC. The VCM may run also on a VM located in a regular server. The VCM then programs each of the virtual switches with the specific routing information relevant to the virtual machines (VMs) associated with that virtual switch. This programming may be performed by updating L2 and/or L3 forwarding tables or other data structures within the virtual switches. In this manner, traffic received at a virtual switch is propagated from a virtual switch toward an appropriate next hop over a tunnel between the source hypervisor and destination hypervisor using an IP tunnel. The ToR switch performs just tunnel forwarding without being aware of the service addressing.

Generally speaking, the "end-users/customer edge equivalents" for the internal DC network comprise either VM or server blade hosts, service appliances and/or storage areas. Similarly, the data center gateway devices (e.g., PE servers 108) offer connectivity to the outside world; namely, Internet, VPNs (IP VPNs/VPLS/VPWS), other DC locations, Enterprise private network or (residential) subscriber deployments (BNG, Wireless (LTE etc), Cable) and so on.

In addition to the various elements and functions described above, the system 100 of FIG. 1 further includes a Management System (MS) 190. The MS 190 is adapted to support various management functions associated with the data center or, more generically, telecommunication network or computer network resources. The MS 190 is adapted to communicate with various portions of the system 100, such as one or more of the data centers 101. The MS 190 may also be adapted to communicate with other operations support systems (e.g., Element Management Systems (EMSs), Topology Management Systems (TMSs), and the like, as well as various combinations thereof).

The MS 190 may be implemented at a network node, network operations center (NOC) or any other location capable of communication with the relevant portion of the system 100, such as a specific data center 101 and various elements related thereto. The MS 190 may be implemented as a general purpose computing device or specific purpose computing device, such as described below with respect to FIG. 5.

Figure 2:
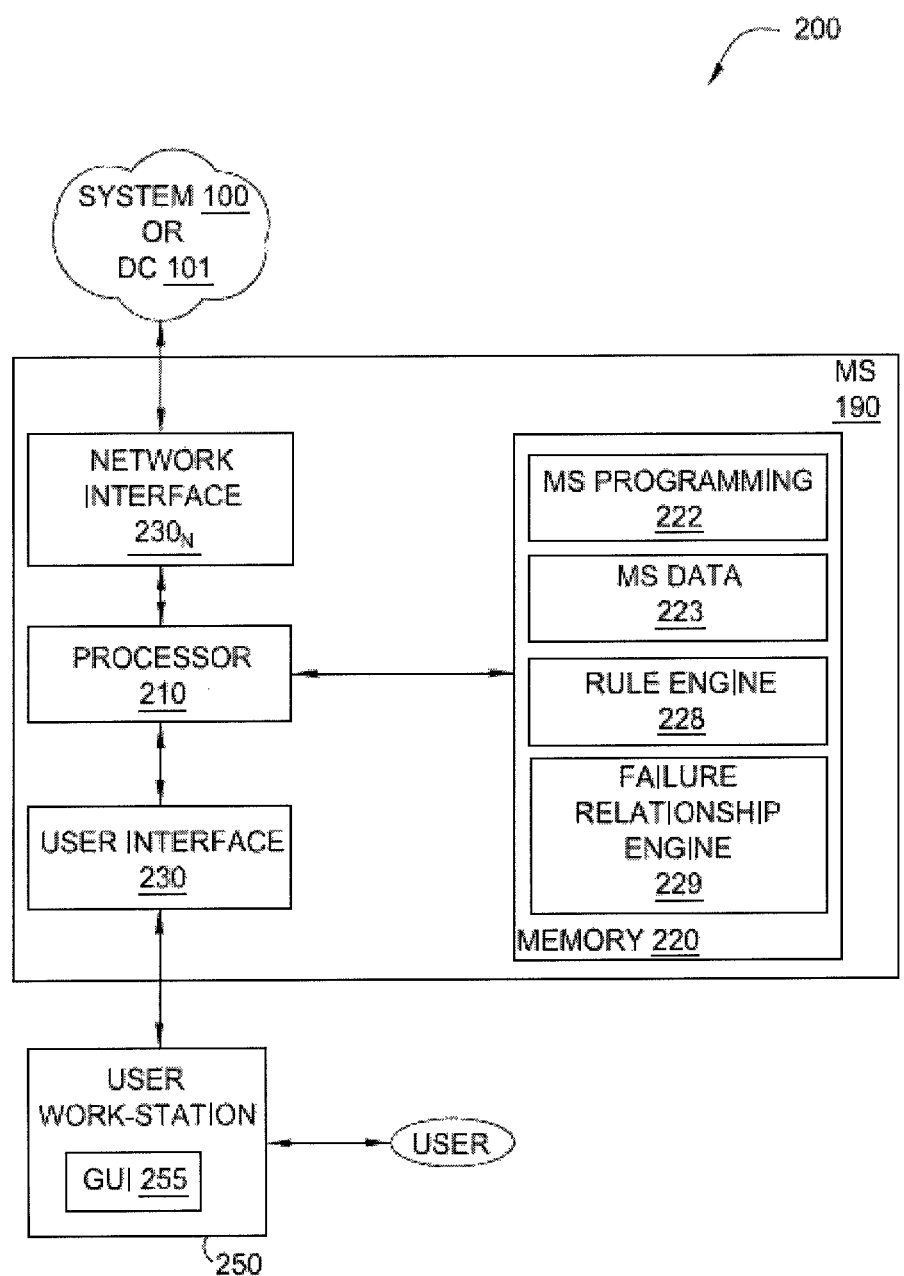
FIG. 2 depicts an exemplary management system suitable for use in the system of FIG. 1.

FIG. 2 depicts an exemplary management system suitable for use as the management system of FIG. 1. As depicted in FIG. 2, MS 190 includes one or more processor(s) 210, a memory 220, a network interface 230N, and a user interface 230I. The processor(s) 210 is coupled to each of the memory 220, the network interface 230N, and the user interface 230I.

The processor(s) 210 is adapted to cooperate with the memory 220, the network interface 230N, the user interface 230I, and the support circuits 240 to provide various management functions for a data center 101 and/or the system 100 of FIG. 1.

The memory 220, generally speaking, stores programs, data, tools and the like that are adapted for use in providing various management functions for the data center 101 and/or the system 100 of FIG. 1.

The memory 220 includes various management system (MS) programming modules 222 and MS databases 223 adapted to implement network management functionality such as discovering and maintaining network topology, processing VM related requests (e.g., instantiating, destroying, migrating and so on) and the like.

The memory 220 includes a rules engine 228 (e.g., DROOLS) operable to process events of virtualized and/or non-virtualized objects, entities, protocols and the like associated with the data center objects or entities within the data center against a data structure representing a current hierarchical failure relationship of these objects or entities to identify thereby events which may be repetitive or extraneous such that corresponding alarms need not be generated. That is, where events associated with the failure of a parent entity (e.g., a virtual switch) necessarily result in the failure of a child entity (e.g., a port of the virtual switch), the generation of an alarm associated with the virtual switch failure renders the generation of an alarm associated with the virtual switch port failure unnecessary since the virtual switch port failure may be assumed where the virtual switch itself has failed.

The memory 220 also includes a failure relationship engine 229 operable to construct a data structure or otherwise define the hierarchy of failure relationships in a manner suitable for use by the rules engine 228. Generally speaking, the hierarchy of failure relationships identifies hierarchically higher level objects, entities, protocols and the like which, upon failure, necessarily cause the failure of corresponding hierarchically lower level objects, entities, protocols and the like.

In various embodiments, the rules engine 228 processes each received event according to one or more rules, such as described more detail below with respect to FIG. 3.

In various embodiments, the MS programming module 222, rules engine 228, failure relationship engine 229 are implemented using software instructions which may be executed by a processor (e.g., processor(s) 210) for performing the various management functions depicted and described herein.

The network interface 230N is adapted to facilitate communications with various network elements, nodes and other entities within the system 100, DC 101 or other network to support the management functions performed by MS 190.

The user interface 230I is adapted to facilitate communications with one or more user workstations (illustratively, user workstation 250), for enabling one or more users to perform management functions for the system 100, DC 101 or other network.

As described herein, memory 220 includes the MS programming module 222, MS databases 223, rules engine 228 and failure relationship engine 229 which cooperate to provide the various functions depicted and described herein. Although primarily depicted and described herein with respect to specific functions being performed by and/or using specific ones of the engines and/or databases of memory 220, it will be appreciated that any of the management functions depicted and described herein may be performed by and/or using any one or more of the engines and/or databases of memory 220.

The MS programming 222 adapts the operation of the MS 140 to manage various network elements, DC elements and the like such as described above with respect to FIG. 1, as well as various other network elements (not shown) and/or various communication links therebetween. The MS databases 223 are used to store topology data, network element data, service related data, VM related data, BGP related data, IGP related data and any other data related to the operation of the Management System 190. The MS program 222 may implement various service aware manager (SAM) or network manager functions.

Each virtual and nonvirtual object/entity generating events communicate these events to the MS 190 or other entity via respective event streams. The MS 190 processes the event streams as described herein and, additionally, maintains an event log associated with each of the individual event stream sources. In various embodiments, combined event logs are maintained.

Events and Event Logs

Each virtual and nonvirtual object/entity generating events (i.e., each event source object/entity) communicate these events to the MS 190 or other entity via respective event streams. The MS 190 processes the event streams as described herein and, additionally, maintains an event log associated with each of the individual event stream sources. In various embodiments, combined event logs are maintained.

Each event log generally includes data fields providing, for each event, (1) a timestamp, (2) an event source object/entity identifier (3) any parent object/entity identifiers (optional), (4) an event type indicator and other information as appropriate.

The timestamp is based upon the time the event was generated, the time the event was received and logged, or some other relevant timestamp criteria.

The event source object/entity identifier identifies the object/entity generating the event. The identifier may comprise, illustratively, a Universal Unique Identifier (UUID), an IP address or any other suitable identifier.

The optional parent object/entity identifiers identify any parent objects/entities associated with the event source object/entity. Specifically, most source objects/entities are associated with one or more parent objects/entities, wherein a failure of a parent object/entity necessarily results in a failure of any child object/entities. Thus, the parent object/entity identifiers identify those objects/entities in a failure relationship with the source object/entity, wherein the parent objects/entities comprise hierarchically higher level entities having failure relationships with the corresponding and hierarchically lower level source (i.e., child) entity.

Event type indicator indicates the type of event generated by the event source object/entity. Various types of events may be generated. For example, nonvirtual object/entity sourced events may comprise events such as UP, DOWN, SUSPEND, OFF-LINE, ON-LINE, FAIL, RESTORE, INITIALIZED and so on; virtual object/entity, virtual machine (VM) and VM-appliance sourced events may comprise events such as UP, DOWN, SUSPEND, STOP, CRASH, DESTROY, CREATE and so on; and IGP/BGP sourced events may comprise events such as New Prefix, Prefix withdrawn, Prefix Unreachable, Prefix Redundancy Changed and so on. Other examples will be known to those skilled in the art.

In various embodiments, each event source object/entity has knowledge of one or more respective parent objects/entities. In these embodiments, the event source object/entity includes parent object/entity identifiers within some or all of the events generated by the source object/entity.

In various embodiments, some or all of the event source objects/entities do not possess knowledge of respective parent objects/entities. However, current parent information for each of the event source objects/entities may be associated with each received event such that the parent information may be included within the event logs. The current parent information may be derived from provisioning information, stored correlation information and/or other management information. This information may be stored in, illustratively, the MS database 223 or other location.

Current Hierarchy of Failure Relationships

In various embodiments, current parent information for event source objects/entities may be retrieved or derived from information within a currently maintained hierarchy of failure relationships of some or all objects/entities within the DC.

The current hierarchy of failure relationships may be organized according to any of a number of data structures or formats, such as discussed in more detail herein. The current hierarchy of failure relationships, however organized, is substantially continually updated in response to changes in the state of the various real and/or virtual objects/entities within the DC, such as due to provisioning changes, object/event failures, object/event capability changes or service degradations and so on to provide thereby a relatively instantaneous or current "snapshot" of parent/child failure relationships of the various object/entities within the DC. Thus, the current hierarchy of failure relationships may be used to identify, for each event source object/entity, any corresponding parent objects/entities contemporaneously associated with an event source object/entity generating an event to be logged. This contemporaneous parent/child information may be included within the event log(s) associated with incoming events.

In various embodiments, the current hierarchy of failure relationships may be formed using a table of associations, using one or more directed trees, using a forest of directed trees forest of directed trees or using some other structure. The current hierarchy of failure relationships may be maintained by the failure relationship engine 229, MS programming 222 or other module within MS 190.

Thus, received events may be logged in a manner including event source object/entity identification along with corresponding parent object/entity information.

Each received event is part of at least one event pair. Each event pair is (typically) hierarchical in nature, such as a "virtual port up" event being paired with "BGP up" event, a "virtual port down" event being paired with a "BGP down" event, and so on. In essence, each event pair comprises a source or root cause type of event and a corresponding expected or symptom type of event.

Various embodiments contemplate that each of a plurality of rules used for processing received events has associated with it a hash table. Further, each type of event is processed differently using hash tables of relevant rules. The hash tables only hold information that is currently relevant, such as received source events where a corresponding expected event is not yet received, received expected events where a corresponding source event has not yet been received, received events that serve to negate an expected event and so on. Received events comprising anticipated source or expected events result in a corresponding hash table entry being deleted to conserve resources. The process is extremely fast and well optimized to the DC environment.

While various types of event pairs are contemplated, to simplify the discussion herein the embodiments will be primarily discussed within the context of the following event pairs:

| Source Event | Expected Event |
|---|---|
| Virtual port down | BGP down (other entities, links etc. also down) |
| Virtual port up | BGP up |

Generally speaking, various scenarios are contemplated with respect to event pairs, such as virtual port/BGP event pairs. Each source event is associated with a corresponding expected event. Failure to receive the corresponding expected event must be determined and, if appropriate, an alarm must be generated.

The first scenario comprises an extraneous alarm scenario. For example, if a virtual port down event is received, it is expected that a corresponding BGP down event as well as events indicative of other entities failing may also be expected. If a BGP down event is then received, this is expected behavior and there is no need for a further alarm even though the virtual port is unreachable. This alarm suppression mechanism reduces alarm traffic without compromising alarm information since the relationship between various entities is known. In this case, the alarm associated with the failed virtual port may serve as a proxy for the alarm associated with the failed BGP event and other events indicative of failures of entities dependent upon the failed virtual port. That is, those alarms which are inevitably generated after the failure of the virtual port (or, more generally, a hierarchically superior entity) may be suppressed as superfluous.

A second scenario comprises a failure to receive an expected event indicative of corresponding dependent entity restoration. For example, a virtual port up event is received, then it is expected that a corresponding BGP up event will also be received. But if the corresponding BGP up event is not received within a predetermined time period (e.g., during an event correlation window), then an alarm needs to be triggered; for example, there may be an ongoing BGP failure, there may be a failure of BGP to advertise a Vport prefix after a Vport Up event and so on. In either case, this is a new failure. In particular, restoration of a previously failed higher order entity should result in restoration of corresponding previously failed lower order entities. However, if restoration of the previously failed higher order entity does not result in restoration of the corresponding previously failed lower order entities, then an alarm should be generated.

A third scenario comprises a failure to receive an expected event indicative of corresponding dependent entity failure. For example, if a virtual port down event is received, then it is expected that a corresponding BGP down event will also be received. However, if the corresponding BGP down event is not received and an alarm associated with the failed BGP is not generated, other entities within the data center may continue to operate as if the failed BGP is still functional.

The fourth scenario comprises receiving duplicate events (e.g., BGP events) after a migration of a corresponding virtual machine. For example, if a virtual machine is moved or migrated between virtual switches, virtual controllers and the like, each BGP corresponding to the virtual ports of the virtual machine are also migrated. In this case, each BGP is associated with a new path or route. If an event indicative of a duplicate path or route is received, then the old path or route must be deleted.

The second and third scenarios discussed above assume an alarm should be generated when a received source event has occurred without receiving a corresponding expected event. However, at times there may be a negating event which would cause the expected event to not occur. For example, if a virtual port down event occurs after a virtual port up event but within a correlation window, then the BGP up event corresponding to the virtual port up event will not be received. In this case, the failure to receive the BGP up event should not cause the generation of an alarm. Other scenarios are contemplated by the inventor as suited for use within the context of the various embodiments.

Various types of events are contemplated. As previous noted, each event may comprise a source or root cause event, an expected or symptom event, or a negating event. Further, different rules used to process the received events may view the received events differently. For example, a received virtual port event may be a source event with respect to an expected BGP event. However, the received virtual port event may also be an expected event with respect to a source virtual machine event. Hierarchical position within the data center of the event source provides insight as to the source/expectation arrangement of events. Thus, in various embodiments, almost all events are associated with multiple event pairs.

A plurality of rules is used to process received events. Each rule is associated with a respective hash table to facilitate storage and rapid searching of relevant historical event data. Received events has and the resulting hash values stored as entries into the hash table of a rule as necessary. Hash table entries are deleted when they are no longer indicative of anything of value, such as deleting a hash table entry associated with a source event when a corresponding expected event has been received.

The processing of received event with respect to the various rules will now be described more detail with respect to FIG. 3.

Figure 3:
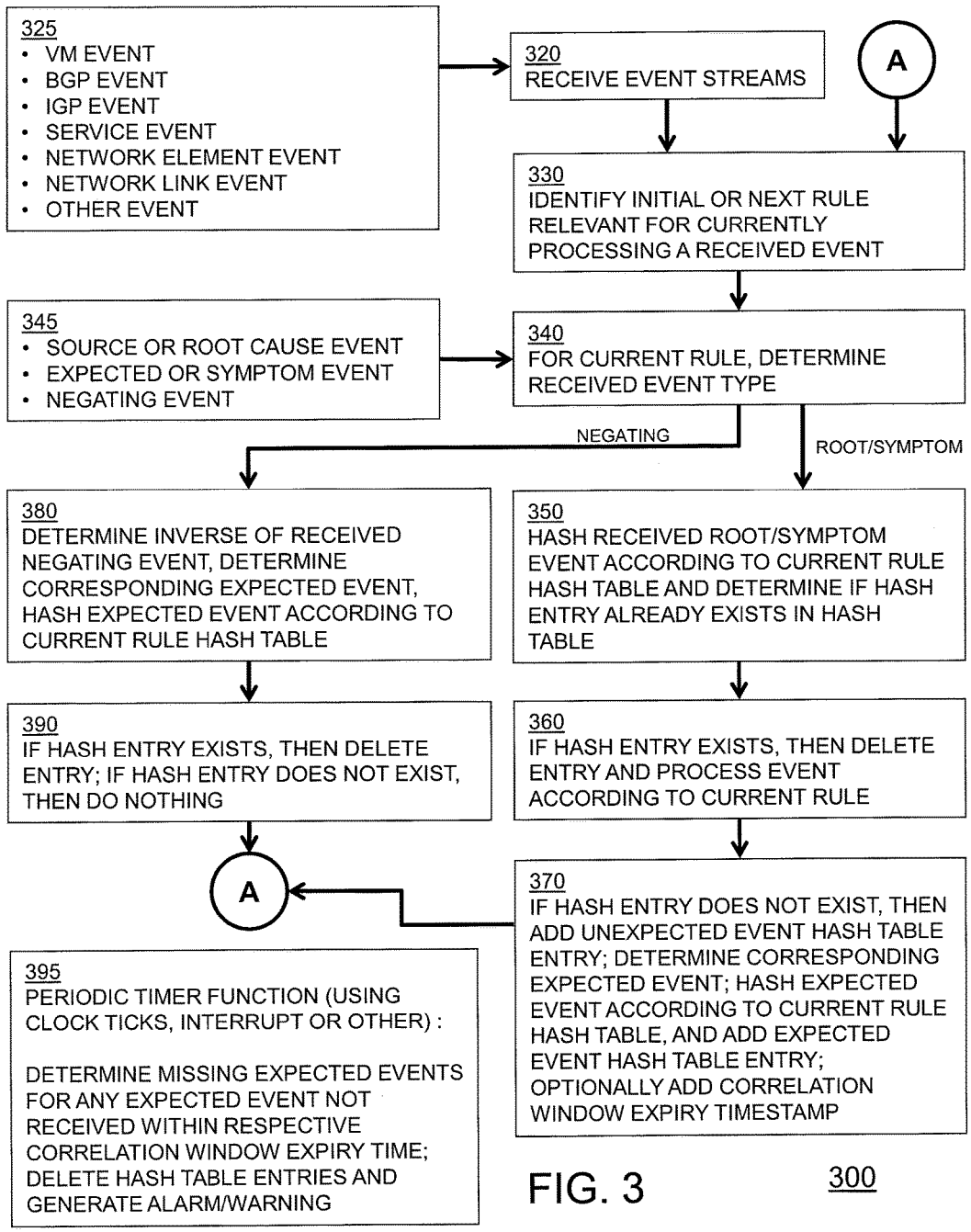
FIG. 3 depicts a flow diagram of methods according to various embodiments.

FIG. 3 depicts a flow diagram of a method according to one embodiment. Specifically, the method 300 of FIG. 3 contemplates various steps performed by, illustratively, the rules engine 228, failure relationship engine 229 and/or other MS programming mechanisms 222 associated with the management system 190. In various embodiments, the rules engine 228, failure relationship engine 229 and/or other MS programming mechanisms 222 are separate entities, partially combined or combined into a single functional module. In various embodiments, these functions are performed within the context of a general management function, an event processing function, and alarm generation function or other function.

Generally speaking, the method 300 of FIG. 3 contemplates that each of a plurality of events included within one or more event streams is processed against one or more rules relevant to the event. Further, each of the rules has associated with it a respective hash table which may be allocated to the rule upon establishment of the rule within the system. The method 300 utilizes the hash table associated with each rule to efficiently determine whether an expected event has failed to occur such that an alarm should be generated, as well as whether an intervening or negating event has occurred such that lack of occurrence of the expected event does not require alarm generation.

At step 320, the method 300 receiving event streams from one or more event-sourcing objects or entities within the data center. The event streams may comprise failure events, warning events, status events and so on. Of particular interest within the context of the various embodiments are failure events. Other embodiments may utilize failure events and warning events. Referring to box 325, event streams may comprise virtual machine (VM) events, BGP events, IGP events, service events, network element events, network link events, and/or other events.

At step 330, an initial or next rule is identified for currently processing a received event. That is, given that each received event may require processing according to or against multiple rules, a first or next one of the multiple rules is selected as the current rule for processing the received event.

At step 340, the event type associated with the received event is determined with respect to the current rule. Referring to box 345, the event may comprise a source or root cause event, and expected or symptom event, a negating event or some other type of event. Generally speaking, the occurrence of a source/root event results in the expected occurrence of a expected/symptom event. A negating event comprises an event that negates or renders unnecessary as an alarm trigger the expected occurrence of the expected/symptom event.

Router system events are processed for the current rule according to steps 350-370. Negating events are processed for the current rule according to steps 380-390. for the received event according to a next rule.

At step 350, the received root or symptom event is hashed according to the current rule hash table to produce a corresponding hash value. A determination is then made as to whether a corresponding hash entry already exists in the hash table.

At step 360, if it is determined at step 350 that a corresponding hash entry already exists in the table, then the event is an expected event. In this case, the existing hash table entry is deleted and the event is processed according to the current rule.

At step 370, if it is determined at step 350 that a corresponding hash entry does not already exist in the table, then the event is an unexpected event (i.e., a source/root cause event for which receiving a corresponding expected/symptom event is now anticipated). In this case, the unexpected event is hashed according to the current rule hash table and a corresponding unexpected event entry is added to the current rule hash table.

Further, the particular expected event corresponding to the received unexpected event is determined, and the determined expected event is hashed according to the current rule hash table, and a corresponding expected event entry is added to the current rule hash table. For example, if virtual port up event is received, then a corresponding expected BGP up event is created and added into table. The converse is also true. It is noted that corresponding root and symptom events may be received out of sequence, wherein receiving one leads to an expectation of receiving the other.

Upon processing the root/symptom event type, the method 300 proceeds to step 330 as previously indicated.

At step 380, a determination is made as to the inverse of the negating event; that is, for which source or root cause events corresponding to expected or symptom events would they are no longer reasonably be in anticipation of receiving the corresponding expected or symptom event due to the occurrence of the negating event. Further, for each determined expected or symptom event, a further determination is made as to the corresponding expected event, which corresponding expected event is hashed according to the current rule hash table.

At step 390, if the hash value of the corresponding expected event determined at step 380 is associated with an existing hash table entry, then the expected event has not yet occurred and the hash table entry is deleted. In this manner, the occurrence of the negating affect is used to indicate a lack of need or expectation for the expected event by deleting the appropriate hash table entry. Similarly, if the hash value of the corresponding expected event determined at step 380 is not associated with an existing hash table entry, then the expected event has occurred and no further action is taken with respect to the hash table.

Upon processing the negating event type, the method 300 proceeds to step 330 as previously indicated.

Generally speaking, steps 380-390 provide that the inverse of the negating event is determined, this inverse event is converted into an expected event, the expected event is hashed according to the rule hash table and a determination is made as to whether a corresponding hash entry exists in hash table.

Optionally, in various embodiments a correlation window, expiry timestamp and/or other temporal parameter is determined with respect to the unexpected event entry added to the current rule hash table or otherwise associated with the unexpected event entry. This temporal parameter defines a time period within which a corresponding expected event should be received. Failure to receive a corresponding expected event within the time period indicates that a failure or warning condition has occurred and that a "missing expected event" alarm or warning should be generated. Parameters associated with an alarm condition and a warning condition may be user selectable, policy defined, determined per service level agreement (SLA) and so on.

Thus, at optional step 395, a periodic timer function or timer expiration step is provided wherein a time tick (or timer interrupt or other timer signal) triggers a determination as to whether any hash table entries are associated with expired unexpected events, which hash table entries are then deleted. That is, at optional step 395, a determination is made regarding whether or not any of the hash tables associated with the various rules includes an unexpected event entry associated with an expired temp oral parameters such that a corresponding missing expected event alarm or warning should be generated. For example, assuming an unexpected event entry has associated with it a 10 second window within which a corresponding expected event should be received, failure to receive that expected event with any 10 second window indicates that the missing expected event alarm or warning should be generated.

Optional step 395 may operate synchronously or asynchronously with respect to the other portions of the method 300 and/or other embodiments.

In various embodiments, the temporal parameter is selected or determined based upon the unexpected event, the corresponding expected event or a combination thereof. In various embodiments, the temporal parameter is a fixed or predetermined time period. In various embodiments, the temporal parameter may be modified or otherwise adapted via policy update or other management message. In various vitamins, the temporal parameter in the modified or otherwise adapted in accordance with a rule.

In various embodiments, the temporal parameter comprises a timestamp representing the time of entry into the hash table of the unexpected event. Such timestamps are typically provided at the time of the hash table entry.

In various embodiments, the temporal parameter comprises a numeric representation of a number of "ticks" of a clock indicative of temporal parameter expiry. For example, the temporal parameter may comprise an integer number of "ticks" of a 30 second clock, wherein 2 ticks represents one minute.

In various embodiments, for each timer tick every existing hash table entry for the hash tables associated with the respective rules is processed to determine whether a current time is equal to or greater than a time associated with a correlation window expiry timestamp. If a current timestamp is equal to or greater than a correlation window expiry timestamp, then an expected event missing condition is detected (i.e., the expected event to not arrive within the correlation window time interval), and the detected event missing condition is forwarded to a Virtual Port Alarm processor, Rule Engine or other entity to raise (or clear) or clear the corresponding alarm as appropriate.

The method 300 of FIG. 3 operates to provide, for each rule, a respective hash table having stored therein entries associated with events from event pairs. When an event pair is resolved, the data associated with the event is removed from the hash table. For example, when a first event results in the anticipation of a corresponding expected event, the occurrence of the corresponding expected event results in deletion of the hash table entry associated with the first event. However, where an event pair remains unresolved for more than a predetermined amount of time, an alarm is generated to indicate the failure of occurrence of an expected event or, conversely, the failure of occurrence of a source event associated with a previously received corresponding expected event. Various embodiments contemplate that timer related processes, expiration of hash table entries and the like occur contemporaneously with the processing of events by the various rules.

For example, as previously noted, each source/root event is associated with or paired with a corresponding expected/symptom. Thus, within a predetermined time frame or correlation window, event data associated with each of the paired source and expected events (i.e., the event pair) should be received. Further, due to transmission delays, event generation delays and the like, the event pair data may be received in any order, irrespective of which event of the event pair occurred first in time.

In various embodiments, the entries in the rule hash table are associated with a time parameter, such as a time to live (i.e., persistence) parameter, a correlation window and the like. When a table entry has expired it is deleted. Thus, if the "time to live" parameter of an expected event stored in a hash table has expired such that the event is eliminated, the absence of the expected event from the table will indicate that the expected event was not received in time and alarm may need to be generated. These time parameters may be adapted based upon the rule, the type of events, policy driven criteria and so on.

In various embodiments, rather than instantiating a timer for each event in the table, a single timer is used wherein each increment or tick of the timer represents a predetermined number of seconds (e.g., 10 seconds, 30 seconds, one minute and the like depending upon the application). For each timer tick, a determination is made as to which if any rule hash table entries have expired. Those rule hash table entries having expired are then deleted from the table. In this manner, the contents of the hash table associated with any rule will hold only information currently relevant to identifying missing events and the like as described above. This further improves the above-described embodiments by providing for smaller hash tables and more efficient processing.

Figure 4:
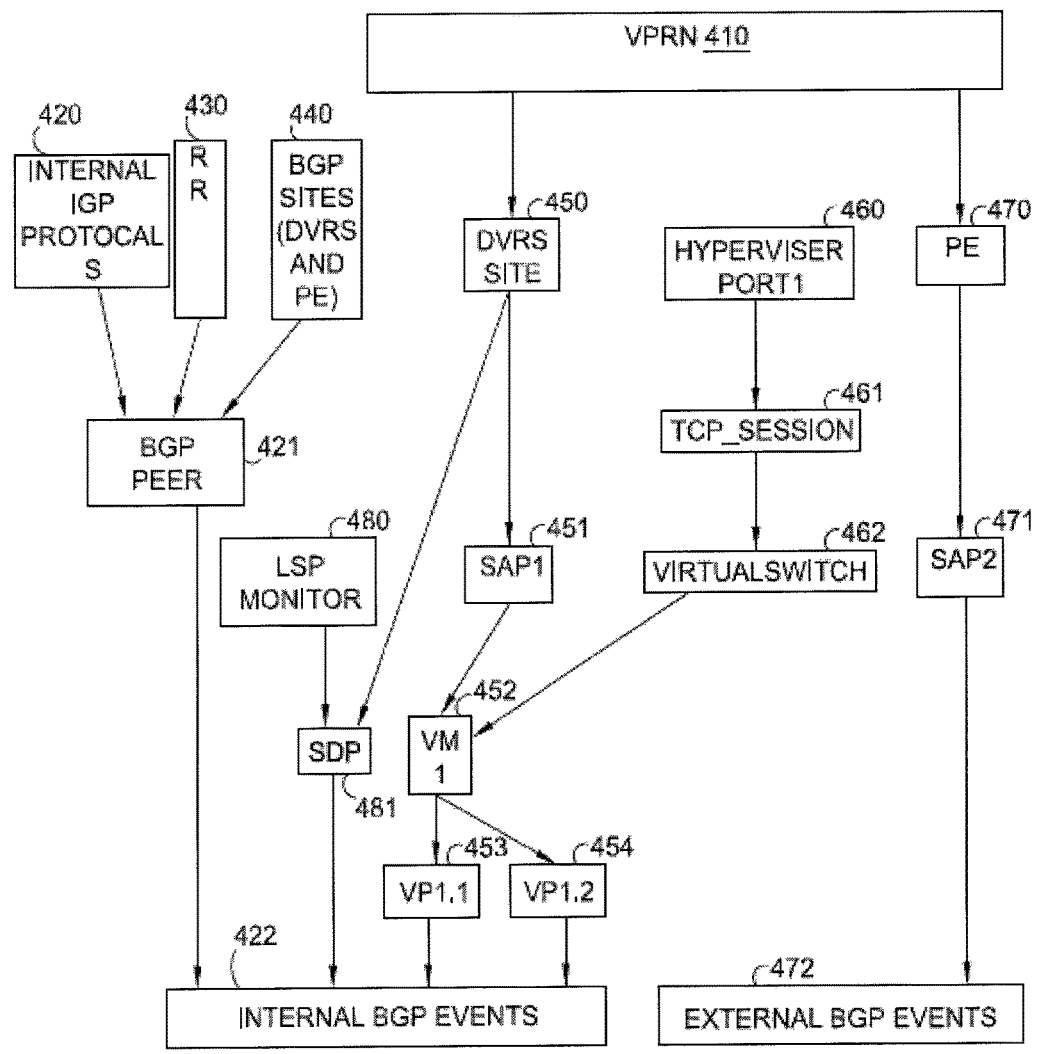
FIG. 4 graphically depicts a hierarchy of failure relationships of DC entities supporting an exemplary virtualized service useful in understanding the embodiments.

FIG. 4 graphically depicts hierarchy of failure relationships of DC entities supporting an exemplary virtualized service useful in understanding the embodiments. Specifically, FIG. 4 depicts virtual and nonvirtual DC objects/entities supporting a Virtual Private Routed Network (VPRN) service as well as the parent/child failure relationships between the various DC objects/entities.

Referring to FIG. 4, it can be seen that a top level VPRN service 410 is a higher-level object with respect to a DVRS site 450 and a provider edge (PE) router 470. PE router 470 is a higher-level object with respect to SAP2 471, which is a higher-level object with respect to external BGP unreachable events 472. DVRS site 450 is a higher-level object with respect to SAP1 451 and SDP 481, which is a higher-level object with respect to internal BGP unreachable events 422. Label Switched Path (LSP) monitor 480 is also a higher-level object with respect to Service Distribution Path (SDP) 481.

SAP1 451 is a higher-level object with respect to a first virtual machine (VM 1) 452, which is a higher-level object with respect to first virtual port (VP1.1) 453 and second virtual port (VP1.2) 454 of the first the end 452. Each of the first 453 and second 454 virtual ports are higher-level objects with respect to internal BGP unreachable events 422.

Internal Gateway Protocols (IGPs) 420, Route Reflectors (RR) 430 and Border Gateway Protocol (BGP) sites (e.g., DVRS and PE) 440 are all higher-level objects with respect to a BGP peer 421, which is a higher-level object with respect to internal BGP unreachable events 422.

A first hypervisor port 460 is a higher-level object with respect to a TCP session 461, which is a higher-level object with respect to a virtual switch 462, which is a higher-level object with respect to first VM 452.

Thus, FIG. 4 depicts the various parent/child failure relationships among a number of DC objects/entities forming an exemplary VPRN service 410. The failure of any object/entity representing a higher-level or parent object/entity in a failure relationship with one or more corresponding lower level or child objects/entities will necessarily result in the failure of the lower-level or child objects/entities. Further, it can be seen that multiple levels or tiers within a hierarchy of failure relationships are provided. Further, it can be seen that an object/entity may have failure relationships with one or more corresponding higher-level or parent objects/entities, one or more lower-level or child object/entities or any combination thereof.

Figure 5:
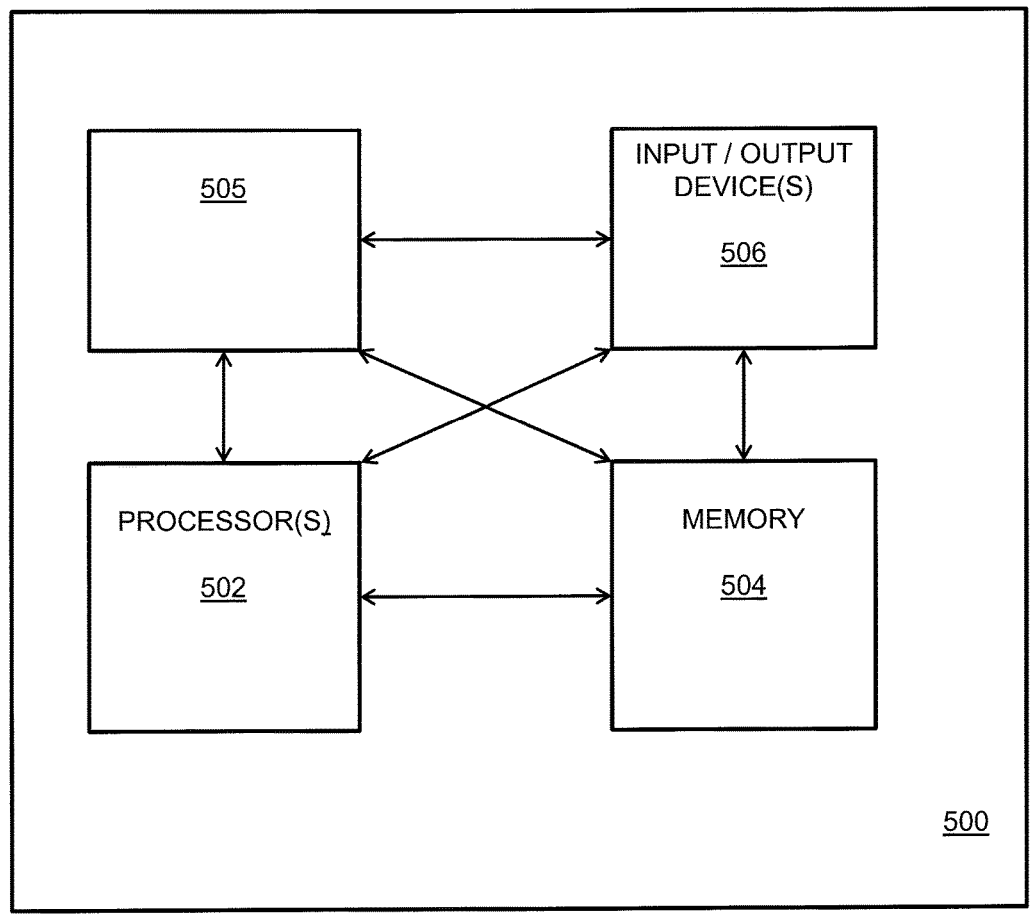
FIG. 5 depicts a high-level block diagram of a computing device suitable for use in performing the functions described herein.

FIG. 5 depicts a high-level block diagram of a computing device, such as a processor in a telecom network element, suitable for use in performing functions described herein such as those associated with the various elements described herein with respect to the figures.

As depicted in FIG. 5, computing device 500 includes a processor element 503 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive or diskette, and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method of generating alarms at a data center (DC), comprising:
   receiving, for processing according to a rule, first and second events associated with a hierarchically arranged entity of the DC;
   hashing the first and second events according to a hash table of the rule;
   in response to the hash table of the rule including a hash table entry corresponding to the first event, deleting the hash table entry corresponding to the first event and processing the first event according to the rule;
   in response to the hash table of the rule not including a hash table entry corresponding to the second event, determining an expected event corresponding to the second event and hashing the expected event corresponding to the second event to provide a hash table entry corresponding to the expected event; and
   in response to a failure to receive the expected event within a predetermined amount of time, generating an alarm.

2. The method of claim 1, wherein said predetermined amount of time is defined with respect to an expiry time of the hash table entry.

3. The method of claim 2, wherein said expiry time of the hash table entry is determined in accordance with a type of unexpected event associated with the hash table entry.

4. The method of claim 2, wherein said expiry time of the hash table entry is determined in accordance with a type of expected event associated with the hash table entry.

5. The method of claim 1, further comprising:
   in response to said failure to receive the expected event within the predetermined amount of time, generating a missing expected event alarm.

6. The method of claim 5, wherein said missing expected event alarm is indicative of a failure to receive a second event of an event pair.

7. A method, comprising:
   receiving, at a management system, an event associated with a hierarchically arranged entity of a data center, said received event comprising a first event of an event pair;
   identifying first and second rules for processing the event, each of the rules having associated with it a respective hash table;
   for the first rule, in response to the received event being paired with an event stored within the respective hash table of the first rule, deleting the event stored within the respective hash table of the first rule; and
   for the second rule, in response to the received event not being paired with an event stored within the respective hash table of the second rule, determining an expected event corresponding to the received event, hashing the expected event corresponding to the received event to provide a hash table entry corresponding to the expected event, and generating an alarm in response to a failure to receive the expected event within a predetermined amount of time.

8. The method of claim 7, further comprising:
   associating with the hash table entry corresponding to the expected event a corresponding expiry time; and
   in response to an expiration of the hash table entry corresponding to the expected event, deleting the hash table entry corresponding to the expected event.

9. The method of claim 8, further comprising:
   in response to said expiration of said hash table entry corresponding to the expected event, generating a missing expected event alarm.

10. The method of claim 9, wherein said missing expected event alarm is indicative of a failure to receive a second event of the event pair.

11. An apparatus configured to generate alarms at a data center (DC), the apparatus comprising:
    at least one processor; and
    at least one memory including computer program code;
    wherein the at least one memory and the computer program code are configured to, with the at least one processor, cause the apparatus to at least perform:
        receiving, for processing according to a rule, first and second events associated with a hierarchically arranged entity of the DC;
        hashing the first and second events according to a hash table of the rule;
        in response to the hash table of the rule including a hash table entry corresponding to the first event, deleting the hash table entry corresponding to the first event and processing the first event according to the rule;
        in response to the hash table of the rule not including a hash table entry corresponding to the second event, determining an expected event corresponding to the second event and hashing the expected event corresponding to the second event to provide a hash table entry corresponding to the expected event; and
        in response to a failure to receive the expected event within a predetermined amount of time, generating an alarm.

12. A non-transitory computer readable storage medium storing instructions configured to cause an apparatus to at least perform:
    receiving, for processing according to a rule, first and second events associated with a hierarchically arranged entity of a data center;
    hashing the first and second events according to a hash table of the rule;
    in response to the hash table of the rule including a hash table entry corresponding to the first event, deleting the hash table entry corresponding to the first event and processing the first event according to the rule;
    in response to the hash table of the rule not including a hash table entry corresponding to the second event, determining an expected event corresponding to the second event and hashing the expected event corresponding to the second event to provide a hash table entry corresponding to the expected event; and
    in response to a failure to receive the expected event within a predetermined amount of time, generating an alarm.

* * * * *